United States Patent
Roodenburg et al.

(10) Patent No.: US 10,228,078 B2
(45) Date of Patent: Mar. 12, 2019

(54) MARINE PIPELINE INSTALLATION SYSTEM AND MARINE PIPELINE INSTALLATION METHOD

(71) Applicant: ITREC B.V., Schiedam (NL)

(72) Inventors: Joop Roodenburg, Schiedam (NL); Ronny Lambertus Waltherus Nouwens, Schiedam (NL)

(73) Assignee: ITREC B.V., Schiedam (NL)

( * ) Notice: Subject to any disclaimer, the term of this patent is extended or adjusted under 35 U.S.C. 154(b) by 0 days.

(21) Appl. No.: 15/551,991

(22) PCT Filed: Feb. 18, 2016

(86) PCT No.: PCT/NL2016/050112
§ 371 (c)(1),
(2) Date: Aug. 18, 2017

(87) PCT Pub. No.: WO2016/133388
PCT Pub. Date: Aug. 25, 2016

(65) Prior Publication Data
US 2018/0038516 A1    Feb. 8, 2018

(30) Foreign Application Priority Data

Feb. 19, 2015   (NL) ...................................... 2014316

(51) Int. Cl.
*F16L 1/20*     (2006.01)
*B63B 35/03*    (2006.01)
*F16L 1/23*     (2006.01)

(52) U.S. Cl.
CPC .............. *F16L 1/207* (2013.01); *B63B 35/03* (2013.01); *F16L 1/20* (2013.01); *F16L 1/202* (2013.01);
(Continued)

(58) Field of Classification Search
CPC ... F16L 1/20; F16L 1/202; F16L 1/203; F16L 1/207
(Continued)

(56) References Cited

U.S. PATENT DOCUMENTS 7,226,244 B1    6/2007  De Groot et al.
2014/0010595 A1  1/2014  Maloberti et al.

FOREIGN PATENT DOCUMENTS

WO   WO 2006/085739 A1   8/2006
WO   WO 2011/016719 A1   2/2011
(Continued)

OTHER PUBLICATIONS

International Search Report (PCT/ISA/210) issued in PCT/NL2016/050112, dated Sep. 23, 2016.
(Continued)

*Primary Examiner* — Tara Mayo-Pinnock
(74) *Attorney, Agent, or Firm* — Birch, Stewart, Kolasch & Birch, LLP (57) ABSTRACT

A marine pipeline installation system and marine pipeline installation method are disclosed. The marine pipeline installation system includes a pipeline launch tower for launching the pipeline in a firing line along the pipeline launch tower into the sea, and one or more tensioners supported by the pipeline launch tower. The system further includes a pipeline guide supported in a pipeline launch trajectory between a pipeline storage and the firing line above the one or more tensioners, wherein the pipeline guide is provided opposite the firing line relative to the pipeline launch tower. A guide support structure is provided, which is embodied as a single-sided guide support arm arranged on one side of the pipeline guide only.

15 Claims, 4 Drawing Sheets

(52) U.S. Cl.
CPC ............... *F16L 1/203* (2013.01); *F16L 1/205* (2013.01); *F16L 1/23* (2013.01)

(58) Field of Classification Search
USPC ......................................................... 405/166
See application file for complete search history.

(56) References Cited

FOREIGN PATENT DOCUMENTS

| WO | WO 2012/091556 A1 | 7/2012 |
| WO | WO 2014/014343 A1 | 1/2014 |
| WO | WO 2014/120004 A1 | 8/2014 |
| WO | WO 2014/148907 A1 | 9/2014 |
| WO | WO 2015/069099 A1 | 5/2015 |

OTHER PUBLICATIONS

Search Report issued in Dutch Patent Application No. 2014316, completed Oct. 13, 2015.
Written Opinion (PCT/ISA/237) issued in PCT/NL2016/050112, dated Sep. 23, 2016.

MARINE PIPELINE INSTALLATION SYSTEM AND MARINE PIPELINE INSTALLATION METHOD

The present invention relates to a marine pipeline installation system for laying on the seabed an offshore pipeline. Such marine pipeline installation systems are produced by the applicant and commercially available for several decades.

Known marine pipeline installation systems comprise a pipeline launch tower, which is adapted for launching the pipeline in a firing line along said pipeline launch tower into the sea, and one or more tensioners supported by the pipeline launch tower, the one or more tensioners being configured to engage the pipeline in the firing line and support at least part of the weight of a launched pipeline. Such systems further comprise a guide support structure mounted to the pipeline launch tower, and a pipeline guide supported by the guide support structure in a pipeline launch trajectory between a pipeline storage and the firing line above the one or more tensioners. The pipeline guide provides an arcuate guide surface in a vertical plane for guiding said pipeline from the pipeline storage into the firing line.

In embodiments, the pipeline storage and firing line are provided at opposite sides of the pipeline launch tower. See e.g. FIG. 8 of U.S. Pat. No. 7,226,244 of the same applicant. In such embodiments, the pipeline guide is provided essentially above the pipeline launch tower, and the major part of the pipeline launch trajectory is at the opposite side of the pipeline launch tower as the firing line is. In other words, the pipeline guide and the pipeline launch tower are provided at the same side of the firing line. A multitude of such known marine pipeline installation systems is successfully in operation, to the satisfaction of the customers.

In alternative embodiments, which are considered the closest prior art of the present invention, such as shown in FIG. 1 of WO2011/016719 of the same applicant, the pipeline guide is provided opposite the firing line relative to the pipeline launch tower. In other words, the pipeline guide and the pipeline launch tower are provided at opposed sides of the firing line. Consequently, the pipeline guide and the pipeline launch trajectory are provided at the same side of the pipeline launch tower as the firing line is.

It is noticed that in both of the above-described embodiments, the pipeline launch tower is provided in a plane defined by the vertical plane of the pipeline guide and pipeline launch trajectory, extending through the firing line.

From US2014/0010595 an alternative marine pipeline installation system is known wherein the pipeline launch tower is provided at a side of the firing line, and the vertical plane of the pipeline guide extends perpendicular thereto. In other words, the pipeline launch tower is provided aside of a plane defined by the vertical plane of the pipeline guide and pipeline launch trajectory, extending through the firing line.

The present invention relates to an improved marine pipeline installation system of the type mentioned as closest prior art above, and a marine pipeline installation method for lowering and/or raising an offshore pipeline, which is in particular advantageous for handling accessories, such as end fittings.

According to a first aspect of the present invention, the marine pipeline installation system is characterized in that the guide support structure is embodied as a single-sided guide support arm arranged on one side of the pipeline guide only, one end of which is mounted to the pipeline launch tower, and onto the other end of which guide support arm a cantilevered carrier is provided to support the pipeline guide.

An advantage of the first aspect of the invention is that the firing line, at least near the pipeline guide, is accessible in a generally lateral direction from the side opposite the side of the guide support arm. As such, it is possible for an accessory handling device, such as a deck-mounted crane to introduce accessories in the firing line from aside, above the tensioners, where conventionally part of the pipeline guide support is present. Possibly, in combination with movable tensioners, the firing line is accessible from aside over an elongated distance, possibly the entire distance from the pipeline guide to deck level.

Another possible advantage of a single-sided guide support is its improved construction, which is more light-weight and possibly easier to construe.

In embodiments, the single-sided guide support arm arranged on one side of the pipeline guide only is mounted movable to the pipeline launch tower, and a guide support arm drive is provided to adjust the position and/or orientation of the guide support arm. Advantageously, the guide support arm is movable to a position remote from the firing line, thereby clearing the firing line and a path towards the firing line, where in operation the pipeline guide was provided. The clear envelope thus created may be sufficient to allow accessories, such as end fittings, to pass the pipeline guide in the firing line. For example, the single-sided support arm is mounted skiddable to the pipeline launch tower.

Advantageously, the single-sided guide support arm arranged on one side of the pipeline guide only is mounted pivotably to the pipeline launch tower about a horizontal pivot axis, perpendicular to the vertical plane of the arcuate guide surface, and a guide support arm drive is provided to adjust the angular orientation of the guide support arm. Advantageously, a cylinder is provided between the pipeline launch tower and the guide support arm to adjust the angular orientation of the guide support arm. The guide support arm may be pivotable in an upward direction, through the firing line, to a position above the pipeline launch tower (as visible in FIG. 3*c*), thereby clearing the firing line and a path towards the firing line, where in operation the pipeline guide was provided. Furthermore, it is conceivable that the guide support arm is pivotable downward, away from the firing line, thereby also clearing the firing line to a certain extent. The clear envelope thus created may be sufficient to allow accessories, such as end fittings, to pass the pipeline guide in the firing line.

In embodiments, the marine pipeline installation system further comprises a vessel onto which the pipeline launch tower is arranged. Preferably, the vessel comprises a hull, a moonpool and a deck, wherein the pipeline launch tower is mounted on deck adjacent the moonpool such that the firing line extends through the moonpool. According to the first aspect of the invention, the pipeline guide is provided opposite the firing line relative to the pipeline launch tower. In other words, the firing line and pipeline guide are provided at the same side of the tower, and as a consequence the moonpool is provided between the pipeline storage and the pipeline launch tower. In alternative embodiments, the vessel does not comprise a moonpool and the firing line extends at an aft side of the vessel, or at a side of the vessel. In embodiments, the marine pipeline installation system further comprises an adjuster between the deck and the pipeline launch tower, and the pipeline launch tower is mounted pivotable to said vessel to adjust the inclination of the pipeline launch tower. Advantageously, the adjuster is provided at a side of the pipeline launch tower opposite the firing line, attributing to the accessibility of the firing line.

In embodiments where the marine pipeline installation system further comprises a vessel onto which the pipeline launch tower is arranged, it is both conceivable that the pipeline storage is provided on deck of the vessel, or that the pipeline storage is provided below deck of the vessel. Yet alternatively, the pipeline storage is provided on an additional vessel, e.g. a dedicated pipeline storage vessel.

In embodiments, the pipeline storage is embodied as one or more storage reels from which the pipeline to be installed is unspooled. In alternative embodiments, the pipeline storage is embodied as a carrousel or basket having a vertical axis of rotation.

The offshore pipeline to be laid may be embodied as a rigid pipeline or as a flexible pipeline, but it is also conceivable that the marine pipeline installation is used to install subsea risers.

In embodiments, the marine pipeline installation system further comprises an accessory handling device adapted to position an accessory in an accessory position in the firing line. As indicated above, such an accessory handling device can be embodied as a deck mounted crane. Alternative, commonly known accessory handling devices are known as PLET loaders, and are adapted to position the PLET, an accessory, in the firing line below the one or more tensioners. Yet alternatively, an accessory handling device adapted to handle end fittings may be embodied as an end fitting handling crane, e.g. a knuckleboom crane, provided at an upper end of the pipeline launch tower, which is adapted to transfer an end fitting over the pipeline guide into the firing line. Possibly, the end fittings are transferred to a position above the one or more tensioners, which may in embodiments be adjacent the pipeline guide.

Accessory handling may in particular be advantageous in combination with a movable tensioner, e.g. in horizontal direction out of the firing line, or in a vertical downward direction.

In embodiments, each tensioner comprises a tensioner frame and multiple tracks supported by said tensioner frame, said tracks being adapted for engaging the pipeline and supporting at least part of the weight of the launched pipeline in the firing line.

In particular, the tensioner frame is supported via an associated support assembly, wherein the support assembly of at least one tensioner frame is adapted to allow for displacement of the tensioner frame between an active position, wherein the firing line extends through the tensioner frame between the tracks, so that the tracks can engage on a pipeline, and a retracted and non-operable position, wherein the firing line extends outside the frame of the tensioner. Such a retractable tensioner has been described by the applicant in WO2006/085739. With such retractable tensioners, it is possible to access the firing line from aside over the entire distance between the pipeline guide and deck level.

Alternatively, the tensioner frame is displaceably supported by a tensioner rail which is mounted to the pipeline launch tower, allowing the tensioner to be displaceable in the firing line, along the pipeline launch tower, at least between an upper accessory handling position wherein the one or more tensioners have moved above an accessory position and a lower pipelaying position wherein the one or more tensioners at least partially overlap the accessory position, and wherein a tensioner displacement drive is provided to support and displace the one or more tensioners along the pipeline launch tower.

In embodiments, the pipeline guide is embodied as an aligner wheel. In such embodiments, it is conceivable that the cantilevered carrier of the guide support arm is embodied as a support axle or shaft or hub of the aligner wheel, e.g. embodied as a tube about which the aligner wheel rotates. In alternative embodiments, the pipeline guide is embodied as a semi-circular chute. In such embodiments, it is conceivable that the cantilevered carrier is embodied as a platform.

In embodiments, the marine pipeline installation system further comprising an A&R system for abandonment and recovery of a pipeline, said A&R system comprising:
    an A&R winch and A&R cable adapted to raise, lower and support the weight of the launched pipeline in the firing line,
    an A&R sheaves support structure, mounted to an upper end of the pipeline launch tower at an elevated position above the one or more tensioners,
    a set of two or more A&R cable sheaves, supported by the A&R sheaves support structure, the set A&R cable sheaves guiding said A&R cable from the A&R winch into the firing line along said pipeline launch tower.

According to a possible embodiment of the first aspect of the invention, both the pipeline guide and the set of A&R cable sheaves are provided at an elevated position above the one or more tensioners. Furthermore, both the pipeline guide and one of the A&R cable sheaves are provided tangent the firing line. Embodiments are conceivable wherein the pipeline guide is provided above the set of A&R cable sheaves, wherein the pipeline guide is provided below the set of A&R cable sheaves, or wherein the pipeline guide is essentially level with the set of A&R cable sheaves.

In embodiments, the set A&R cable sheaves is moveable between an active position, wherein the firing line extends adjacent one of the A&R cable sheaves allowing the A&R cable to extend in the firing line, and a retracted and non-operable position wherein a clear envelope around the firing line is created. Such a clear envelope is advantageous to allow the passage of large accessories, such as end fittings, along the set A&R cable sheaves. In embodiments, the set A&R sheaves is pivotable about a vertical pivot axis, e.g. with respect to the A&R sheaves support structure. It is also conceivable that the A&R sheaves support structure is pivotable about a vertical axis. In alternative embodiments, it is conceivable that one or more of the set of two or more A&R cables is movable. For example, the one or more sheaves are mounted pivotable about a horizontal pivot axis, or translatable along a support.

An advantage of the first aspect of the invention is that it is possible to position the A&R sheaves support structure closer to the firing line, where conventionally part of the pipeline guide support is present. In embodiments, both the guide support structure and the A&R sheaves support structure are mounted to an upper end of the pipeline launch tower at an elevated position above the one or more tensioners. The A&R sheaves support structure support a set of two or more A&R cable sheaves guiding said A&R cable from the A&R winch into the firing line along said pipeline launch tower. Commonly, the A&R winch and the firing line are horizontally spaced apart, which distance is thus bridged by guiding the A&R cable over the set A&R cable sheaves. Advantageously, the A&R sheaves support structure is positioned centrally between the A&R cable sheaves. In embodiments the A&R winch is arranged at a distance from the vertical plane defined by the guide surface of the pipeline guide, e.g. adjacent a leg of the pipeline launch tower. In such embodiments, the optimum position of the A&R sheaves support structure may collide with a portion of the guide support structure. With the single-sided guide support arm the position of the A&R sheaves support structure can be optimized without interference with the guide support structure.

In embodiments, the marine pipeline installation system further comprises a pipeline support device arranged below said one or more tensioners and adapted to support the weight of the launched pipeline in the firing line. Such a pipeline support device is preferably embodied as a hang off clamp. Such a pipeline support device is in particular advantageous during accessory handling, e.g. to suspend the already launched pipeline while installing an accessory thereto.

In embodiments, the marine pipeline installation system further comprises a centralizer mounted to the pipeline launch tower, e.g. above and/or below the one or more tensioners, to centralize a pipeline in the firing line. Advantageously, such a centralizer is provided movable to clear the firing line, in particular to allow the passage of accessories such as end fittings. E.g., the centralizer is allowed to open to a certain, sufficient extent, or alternatively the centralizer may be retractable, away from the firing line.

In embodiments wherein rigid pipelines are being laid, the marine pipeline installation system further comprises a straightener, provided between the pipeline guide and the one or more tensioners, to straighten the pipeline. The straightener may be mounted to the pipeline launch tower, possibly via a straightener support arm. In alternative embodiments, it is conceivable that the straightener is mounted to the pipeline guide and/or to the guide support structure.

In embodiments, the pipeline launch tower comprises two spaced apart legs, at an upper end thereof interconnected by an upper horizontal crossbeam. Possibly, horizontal crossbeams are also provided at a lower end or at a central part of the legs.

Advantageously, the one or more tensioners are supported by the pipeline launch tower between the legs, below the upper horizontal crossbeam. This is in particular advantageous in embodiments having retractable tensioners.

To the upper horizontal crossbeam, the end of the single-sided guide support arm, and/ or an A&R sheaves support structure and/or a crane and/or a straightener may be mounted. In embodiments, the single-sided support arm is mounted to an eccentric portion of the upper horizontal crossbeam. In such embodiments, preferably the A&R sheaves support structure is mounted to the opposed eccentric portion of the upper horizontal crossbeam. In embodiments, a crane is mounted to the A&R sheaves support structure above the set of A&R sheaves.

The first aspect of the invention also relates to a marine pipeline installation method for lowering and/or raising an offshore pipeline, and preferably including one or more accessories thereto, wherein use is made of a marine pipeline installation system according to any of the preceding claims 1-10.

In embodiments wherein the marine pipeline installation system further comprises an accessory handling device such as a deck mounted crane, the method including the steps of:
providing the marine pipeline installation,
the accessory handling device introducing the accessory in the firing line from aside.

A second aspect of the invention relates to a marine pipeline installation system for laying on the seabed an offshore pipeline, said marine pipeline installation system comprising:
a pipeline launch tower, which is adapted for launching the pipeline in a firing line along said pipeline launch tower into the sea,
one or more tensioners supported by the pipeline launch tower, the one or more tensioners being configured to engage the pipeline in the firing line and support at least part of the weight of a launched pipeline,
a guide support structure mounted to the pipeline launch tower,
a pipeline guide supported by the guide support structure in a pipeline launch trajectory between a pipeline storage and the firing line above the one or more tensioners, the pipeline guide providing an arcuate guide surface in a vertical plane for guiding said pipeline from the pipeline storage into the firing line,
an end fitting handling crane, e.g. a knuckleboom crane, provided at an upper end of the pipeline launch tower, which is adapted to transfer an end fitting over the pipeline guide into the firing line.

According to the second aspect of the invention, the end fitting handling crane is mounted to the pipeline guide and/or to the guide support structure. This is an advantageous construction in view of the number of elements provided at the upper end of the pipeline launch tower, such as an A&R sheaves support structure, a straightener and/or a centralizer may also be provided. In addition, the position of the end fitting handling crane adjacent the pipeline guide may be advantageous to reduce the reach of the crane, in particular a boom of the crane.

In embodiments, the guide support structure is mounted pivotably to the pipeline launch tower about a horizontal pivot axis. Advantageously, the end fitting handling crane is mounted pivotably about a horizontal pivot axis to a crane support arm and about a parallel horizontal pivot axis to the guide support structure, and the crane support arm and the guide support structure are also mounted pivotable about parallel horizontal pivot axes to the pipeline launch tower, the horizontal axes being perpendicular to the vertical plane of the arcuate guide surface, such that the crane, the crane support arm, the guide support structure and the pipeline launch tower form a parallelogram, and wherein further a parallelogram drive is provided to adjust the angular orientation of the guide support structure and the crane support arm. As such, the orientation and position of the end fitting handling crane can accurately be controlled, in coordination with the orientation and position of the pipeline guide.

In embodiments, an A&R system for abandonment and recovery of a pipeline is provided, said A&R system comprising:
an A&R winch and A&R cable adapted to raise, lower and support the weight of the launched pipeline in the firing line,
an A&R sheaves support structure, mounted to an upper end of the pipeline launch tower at an elevated position above the one or more tensioners,
a set of two or more A&R cable sheaves, supported by the A&R sheaves support structure, the set A&R cable sheaves guiding said A&R cable from the A&R winch into the firing line along said pipeline launch tower.

The aspects of the invention can be introduced separately or in combination. Features described in relation to the first aspect of the invention can also be applied in embodiments according to the second aspect of the invention and vice versa.

The invention is further explained in relation to the drawings, in which.

Figure 1:
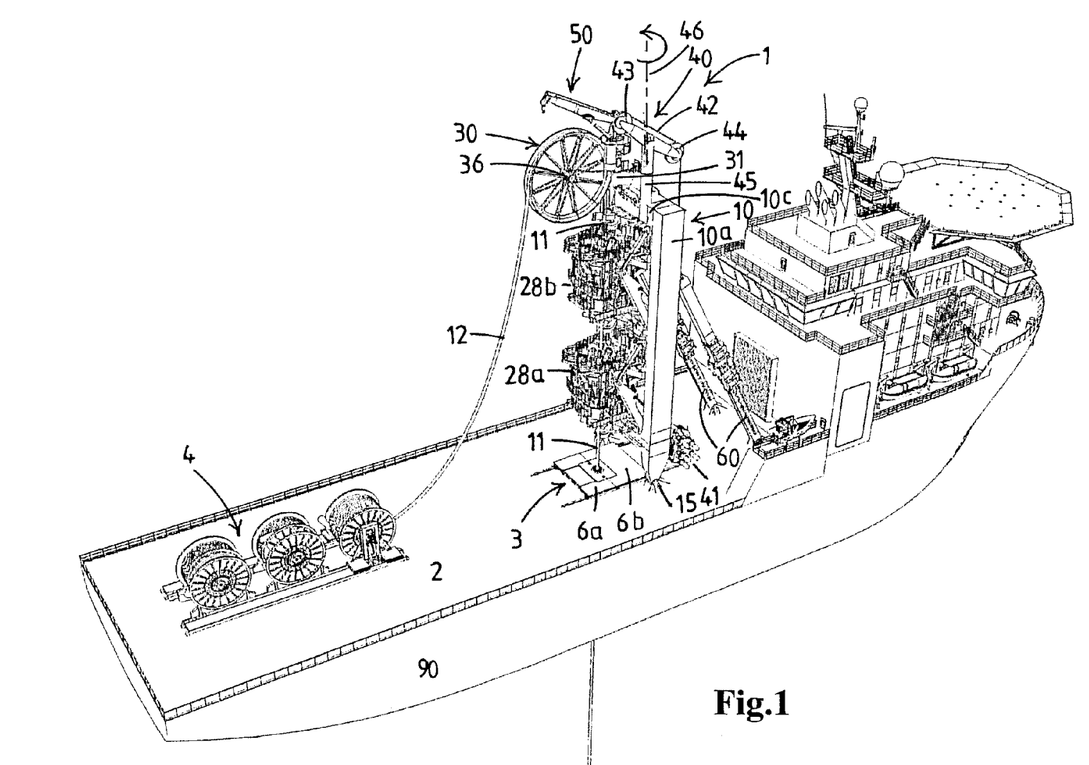
FIG. 1 shows a vessel provided with a first embodiment of a marine pipeline installation according to the first aspect of the invention in a perspective view.

In FIG. 1 a first embodiment of a marine pipeline installation system 1 according to the first aspect of the invention for laying on the seabed an offshore pipeline. In the shown first embodiment, the marine pipeline installation 1 comprises a vessel 90 having a moonpool 3 and a deck 2. In the embodiment of FIG. 1, moonpool hatches 6a, 6b are provided, covering the moonpool area 3 adjacent firing line 11.

Figure 2:
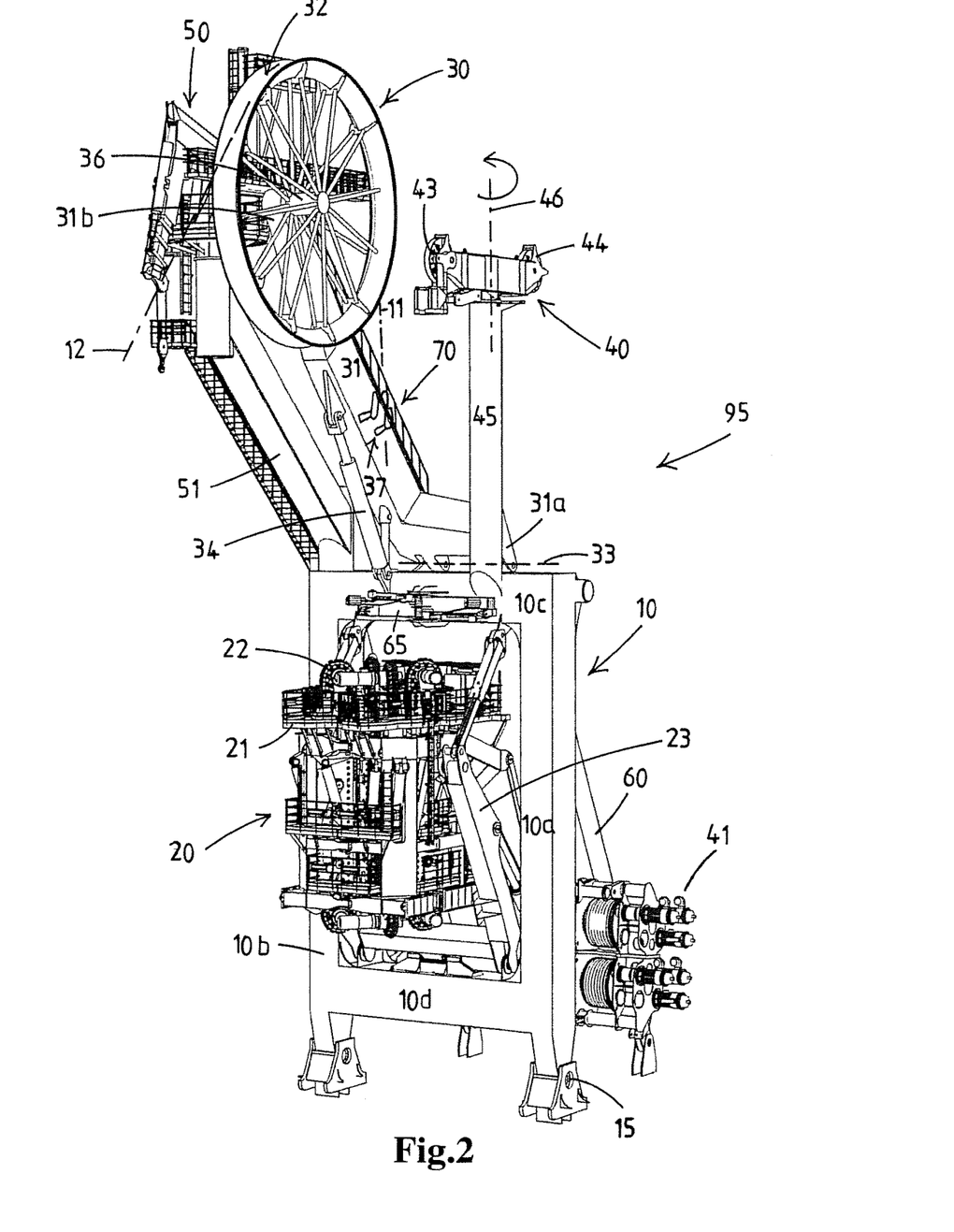
FIG. 2 shows a second embodiment of a marine pipeline installation according to the first aspect of the invention in a perspective view.

In FIG. 2, a second embodiment of a marine pipeline installation system 95 according to the first aspect of the invention is shown, very similar to the first embodiment of FIG. 1. Same parts are given same reference numerals.

On deck 2 a pipeline storage 4 is provided, here embodied as reels having a horizontal rotation axis. Furthermore, a pipeline launch tower 10 is mounted on deck, which is adapted for launching the pipeline in a firing line 11 along said pipeline launch tower through the moonpool 3 into the sea. A pipeline launch trajectory 12 is provided between the pipeline storage 4 and the firing line 11. In the embodiments of FIGS. 1 and 2, the pipeline launch tower 10 is mounted pivotable to said vessel about a horizontal pivot axis 15. Adjusters 60 are provided between the deck 2 and the pipeline launch tower 10 to adjust the laying angle of the pipeline launch tower 10.

In the shown embodiment, the pipeline launch tower 10 comprises two spaced apart legs 10a, 10b, at an upper end thereof interconnected by an upper horizontal crossbeam 10c, and at a lower end thereof interconnected by a lower horizontal crossbeam 10d.

In the embodiment of FIG. 1, two tensioners 28a, 28b are provided above each other. In the embodiment of FIG. 2, only one tensioner 20 is provided. According to the invention, the tensioner 20/tensioners 28a, 28b is/are supported by the pipeline launch tower 10, between the legs 10a, 10b, below the upper horizontal crossbeam 10c, which tensioner/tensioners is/are configured to engage the pipeline in the firing line 11 and support at least part of the weight of a launched pipeline. Three or even more tensioners are also conceivable.

As indicated in detail in the embodiment of FIG. 2, the tensioner 20 comprises a tensioner frame 21 and multiple tracks 22 supported by said tensioner frame 21, said tracks 22 being adapted for engaging the pipeline and supporting at least part of the weight of the launched pipeline in the firing line. Here, the tensioner frame 21 is supported via an associated support assembly 23, wherein the support assembly 23 of the tensioner frame 21 is adapted to allow for displacement of the tensioner frame 21 between an active position, as shown, wherein the firing line 11 extends through the tensioner frame between the tracks, so that the tracks can engage on a pipeline, and a retracted and non-operable position, not shown, wherein the firing line extends outside the frame of the tensioner.

Above the tensioner 20, in the embodiment of FIG. 2, a centralizers 65 is mounted to the pipeline launch tower, in particular to the upper horizontal crossbeam 10c. It is equally conceivable that a centralizer is mounted to the lower horizontal crossbeam 10d.

The marine pipeline installation system further comprises a guide support structure 31 mounted to the pipeline launch tower, which guide support structure according to the first aspect of the invention is embodied as a single-sided guide support arm 31 arranged on one side of the pipeline guide only 31, one end 31a of which is mounted to the pipeline launch tower 10, and onto the other end 31b of which guide support arm a cantilevered carrier 36 is provided to support the pipeline guide 30. In the shown embodiment, the cantilevered carrier 36 of the guide support arm 31 is embodied as a support axle or shaft 36 of an aligner wheel 30.

The marine pipeline installation system comprises a pipeline guide 30, here aligner wheel 30, supported by the guide support structure 31 in a pipeline launch trajectory 12 between the pipeline storage 4 and the firing line 11 above the tensioner 20/tensioners 28a, 28b. The pipeline guide 30 is provided at the same side of the pipeline launch tower 10 as the firing line 11, the pipeline guide 30 providing an arcuate guide surface 32 in a vertical plane for guiding said pipeline from the pipeline storage into the firing line 11. Hence, pipeline guide 30 is provided opposite the firing 11 line relative to the pipeline launch tower 10.

In the shown embodiment, the single-sided guide support arm 31 is mounted pivotably to the pipeline launch tower 10 about a horizontal pivot axis 33, perpendicular to the vertical plane of the arcuate guide surface 32, and wherein a guide support arm drive 34, here an hydraulic cylinder, is provided to adjust the angular orientation of the guide support arm 31.

The marine pipeline installation system further comprises an A&R system 40 for abandonment and recovery of a pipeline. The A&R system comprises an A&R winch 41 and A&R cable 42 adapted to raise, lower and support the weight of the launched pipeline in the firing line. Furthermore, an A&R sheaves support structure 45 is mounted to an upper end of the pipeline launch tower at an elevated position above the one or more tensioners. Here, the A&R sheaves support structure is mounted to the horizontal crossbeam 10c of the pipeline launch tower 10. A set of two or more A&R cable sheaves 43, 44 is supported by the A&R sheaves support structure 45. The set A&R cable sheaves 43, 44 guide said A&R cable from the A&R winch into the firing line along said pipeline launch tower.

In the shown embodiment, the set A&R cable sheaves 43, 44 is pivotable about a vertical pivot axis 46 between an active position, wherein the firing line extends adjacent one of the A&R cable sheaves 43 allowing the A&R cable to extend in the firing line, and a retracted and non-operable position wherein a clear envelope around the firing line is created.

In the shown embodiment, the marine pipeline installation system further comprises an end fitting handling crane 50, here a knuckleboom crane, provided at and upper end of the pipeline launch tower 10, which is adapted to transfer an end fitting over the pipeline guide 30 into the firing line 11. The crane 50 of the shown embodiments of FIG. 1 and FIG. 2 is mounted via a fixed a crane support arm 51 to the horizontal crossbeam 10c of the pipeline launch tower.

In the shown embodiment, the marine pipeline installation system further comprises a straightener 70, provided between the pipeline guide 30 and the tensioner 20. Here, the guide support arm 31 comprises cantilevered straightener carriers 37, to which the straighteners 70 are mounted.

Figure 3:
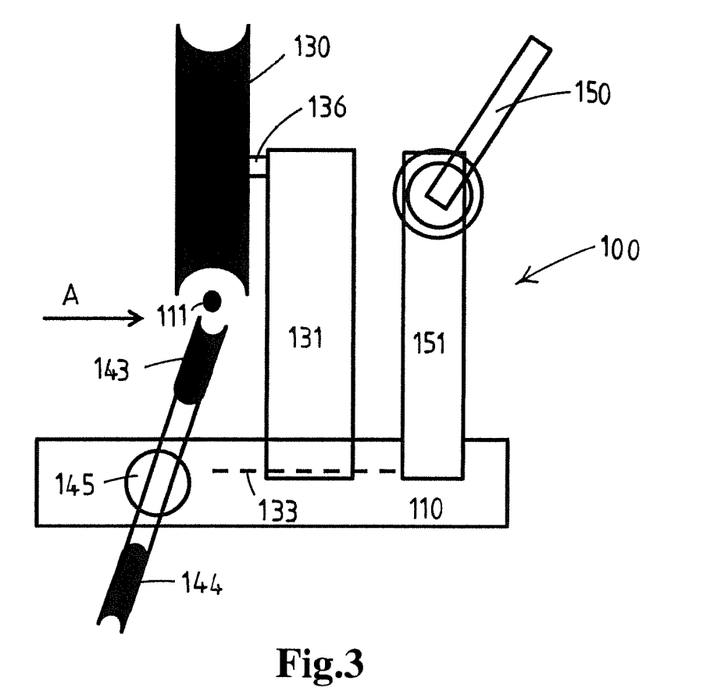
FIG. 3 is a schematical top view of a third embodiment of a marine pipeline installation according to the first aspect of the invention.

In FIG. 3, the first aspect of the invention is explained in a schematical top view. Similar parts are given the same reference numeral as in FIG. 1, to which '100' is added. The marine pipeline installation system 100 comprises a pipeline launch tower 110, a guide support arm 131 with a cantilevered carrier 136 and a pipeline guide 130. The guide support arm is pivotable about pivot axis 133. Furthermore, an A&R sheaves support structure 145 is provided, supporting a set of two A&R cable sheaves 143, 144. A knuckle-boom crane 150 is mounted via a fixed a crane support arm 151 to the pipeline launch tower 110.

In the shown configuration, both A&R sheave 143 and pipeline guide 130 are provided adjacent firing line 111. When the set of A&R cable sheaves is vertically offset with respect to the pipeline guide 130, or when the set of A&R cable sheaves has moved away from the firing line 111, at least near the pipeline guide 130, the firing line 111 is accessible in a generally lateral direction from the side opposite the side of the guide support arm, indicated with arrow A. As such, it is possible for accessory handling means, such as a deck-mounted crane to introduce accessories in the firing line from aside.

Figures 4A, 4B:
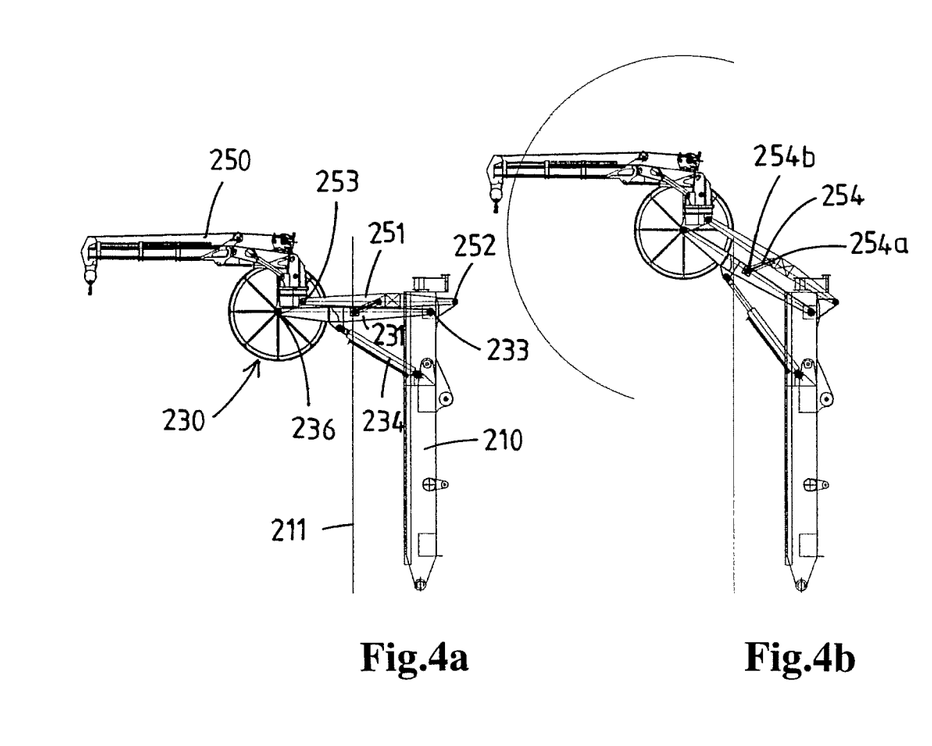
FIGS. 4a-4c are schematical side views of an embodiment of the marine pipeline installation according to the second aspect of the invention.
Figure 4C:
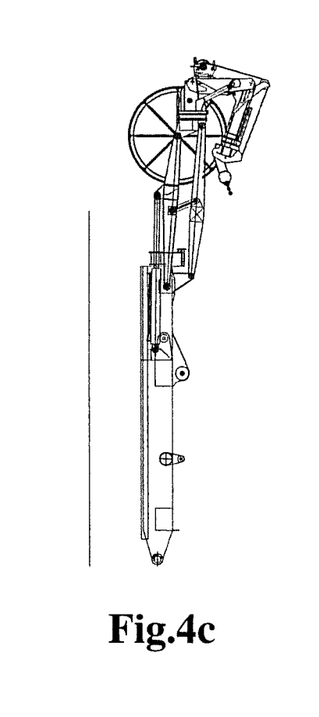

In FIGS. 4a-4c, a portion of an embodiment of the marine pipeline installation according to the second aspect of the invention is shown in three different orientations. In particular, of the marine pipeline installation system of the second aspect of the invention a pipeline launch tower 210 is shown, to which a guide support structure 231 is pivotably mounted about horizontal pivot axis 233. A pipeline guide 230 is supported by the guide support structure, which is here an aligner wheel pivotable about pivot axis 236. It is noted that the guide support structure 231 is not necessarily a single-sided guide support arm arranged on one side of the pipeline guide only with a cantilevered carrier according to the first aspect of the invention, but it may possibly well be such a support structure with a cantilevered carrier.

In the shown embodiment, an end fitting handling crane 250 is provided, which is mounted pivotably about a horizontal pivot axis 253 to a crane support arm 251 and about a parallel horizontal pivot axis 236 to the guide support structure 231. Both the crane support arm 251 and the guide support structure 231 are also mounted pivotable about parallel horizontal pivot axes 252, 253, respectively to the pipeline launch tower 210 the horizontal axes being perpendicular to the vertical plane of the arcuate guide surface, which is here the plane of the drawing. As a result of this construction, the end fitting handling crane 250, the crane support arm 251, the guide support structure 231 and the pipeline launch tower 210 form a parallelogram. An additional linkage 254 is provided, which is linked pivotably about pivot axis 254a to the crane support arm 251 and about pivot axis 254b to guide support structure 231. 35 A parallelogram drive 234 is provided to adjust the angular orientation of the guide support structure 231 and the crane support arm 251. Three different angular orientations are shown in FIGS. 3a, 3b and 3c respectively.

In FIG. 4a, the pipeline guide is retracted away from the firing line 211, a position advantageous for the passage of relatively small accessories such as end fittings past the pipeline guide 230. In FIG. 4b, the pipeline guide is shown in its operational position to guide the pipeline from a pipeline storage into the firing line 211. In FIG. 4c, both the pipeline guide 230 and the end fitting handling crane 250 are moved upwards to a position above the pipeline launch tower 210, thereby clearing the firing line, e.g. for the introduction of very large accessories.

The invention claimed is:

1. A marine pipeline installation system for laying on the seabed an offshore pipeline, said marine pipeline installation system comprising:
   a pipeline launch tower adapted for launching the pipeline in a firing line along said pipeline launch tower into the sea;
   one or more tensioners supported by the pipeline launch tower, the one or more tensioners being configured to engage the pipeline in the firing line and support at least part of the weight of a launched pipeline;
   a guide support structure mounted to the pipeline launch tower; and
   a pipeline guide supported by the guide support structure in a pipeline launch trajectory between a pipeline storage and the firing line above the one or more tensioners,
   wherein the pipeline guide is provided opposite the firing line relative to the pipeline launch tower, the pipeline guide providing an arcuate guide surface in a vertical plane for guiding said pipeline from the pipeline storage into the firing line,
   wherein the guide support structure is embodied as a single-sided guide support arm arranged on one side of the pipeline guide only, one end of the guide support structure being mounted to the pipeline launch tower, and onto the other end of the guide support arm a cantilevered carrier is provided to support the pipeline guide.

2. The marine pipeline installation system according to claim 1, wherein the single-sided guide support arm is mounted pivotably to the pipeline launch tower about a horizontal pivot axis, perpendicular to the vertical plane of the arcuate guide surface, and wherein a guide support arm drive is provided to adjust the angular orientation of the guide support arm.

3. The marine pipeline installation system according to claim 1, wherein the pipeline guide is embodied as an aligner wheel, and wherein the cantilevered carrier of the guide support arm is embodied as a support axle or shaft of the aligner wheel.

4. The marine pipeline installation system according to claim 1, further comprising an abandonment and recovery system for abandonment and recovery of a pipeline, said abandonment and recovery system comprising:
   an abandonment and recovery winch and an abandonment and recovery cable adapted to raise, lower and support the weight of the launched pipeline in the firing line;
   an abandonment and recovery sheaves support structure, mounted to an upper end of the pipeline launch tower at an elevated position above the one or more tensioners; and
   a set of two or more abandonment and recovery cable sheaves, supported by the abandonment and recovery sheaves support structure, the set abandonment and recovery cable sheaves guiding said abandonment and recovery cable from the abandonment and recovery winch into the firing line along said pipeline launch tower.

5. The marine pipeline installation system according to claim 4, wherein the set abandonment and recovery cable sheaves is moveable between an active position, wherein the firing line extends adjacent one of the abandonment and recovery cable sheaves allowing the abandonment and recovery cable to extend in the firing line, and a retracted and non-operable position wherein a clear envelope around the firing line is created.

6. The marine pipeline installation system according to claim 1, further comprising an accessory handling device adapted to position an accessory in an accessory position in the firing line.

7. The marine pipeline installation system according to claim 1, wherein each tensioner comprises a tensioner frame and multiple tracks supported by said tensioner frame, said tracks being adapted for engaging the pipeline and supporting at least part of the weight of the launched pipeline in the firing line, and wherein the tensioner frame is supported via an associated support assembly, wherein the support assembly of at least one tensioner frame is adapted to allow for displacement of the tensioner frame between an active position, wherein the firing line extends through the tensioner frame between the tracks, so that the tracks can engage on a pipeline, and a retracted and non-operable position, and wherein the firing line extends outside the frame of the tensioner.

8. The marine pipeline installation system according to claim 1, wherein each tensioner comprises a tensioner frame and multiple tracks supported by said tensioner frame, said tracks being adapted for engaging the pipeline and supporting at least part of the weight of the launched pipeline in the firing line, and wherein the tensioner frame is displaceably supported by a tensioner rail mounted to the pipeline launch tower, allowing the tensioner to be displaceable in the firing line, along the pipeline launch tower, at least between an upper accessory handling position wherein the one or more tensioners have moved above an accessory position and a lower pipelaying position wherein the one or more tensioners at least partially overlap the accessory position, and wherein a tensioner displacement drive is provided to support and displace the one or more tensioners along the pipeline launch tower.

9. The marine pipeline installation system according to claim 1, further comprising a straightener, provided between the pipeline guide and the one or more tensioners, wherein the straightener is mounted to the pipeline guide and/or to the guide support structure.

10. The marine pipeline installation system according to claim 1, wherein the pipeline launch tower comprises two spaced apart legs, at an upper end thereof interconnected by an upper horizontal crossbeam.

11. The marine pipeline installation system according to claim 10, wherein the one or more tensioners are supported by the pipeline launch tower between the legs, below the upper horizontal crossbeam.

12. A marine pipeline installation system for laying on the seabed an offshore pipeline, said marine pipeline installation system comprising:

a pipeline launch tower adapted for launching the pipeline in a firing line along said pipeline launch tower into the sea;

one or more tensioners supported by the pipeline launch tower, the one or more tensioners being configured to engage the pipeline in the firing line and support at least part of the weight of a launched pipeline;

a guide support structure mounted to the pipeline launch tower;

a pipeline guide supported by the guide support structure in a pipeline launch trajectory between a pipeline storage and the firing line above the one or more tensioners, the pipeline guide providing an arcuate guide surface in a vertical plane for guiding said pipeline from the pipeline storage into the firing line; and an end fitting handling crane, provided at an upper end of the pipeline launch tower, the end fitting handling crane being adapted to transfer an end fitting over the pipeline guide into the firing line, wherein the end fitting handling crane is mounted to the pipeline guide and/or to the guide support structure.

13. The marine pipeline installation system according to claim 12, wherein the guide support structure is mounted pivotably to the pipeline launch tower about a horizontal pivot axis.

14. The marine pipeline installation system according to claim 13, wherein the end fitting handling crane is mounted pivotably about a horizontal pivot axis to a crane support arm and about a parallel horizontal pivot axis to the guide support structure, and wherein the crane support arm and the guide support structure are also mounted pivotable about parallel horizontal pivot axes to the pipeline launch tower, the horizontal axes being perpendicular to the vertical plane of the arcuate guide surface, such that the end fitting handling crane, the crane support arm, the guide support structure and the pipeline launch tower form a parallelogram, and wherein further a parallelogram drive is provided to adjust the angular orientation of the guide support structure and the crane support arm.

15. The marine pipeline installation system according to claim 13, further comprising an abandonment and recovery system for abandonment and recovery of a pipeline, said abandonment and recovery system comprising:

an abandonment and recovery winch and an abandonment and recovery cable adapted to raise, lower and support the weight of the launched pipeline in the firing line;

an abandonment and recovery sheaves support structure, mounted to an upper end of the pipeline launch tower at an elevated position above the one or more tensioners; and a set of two or more abandonment and recovery cable sheaves, supported by the abandonment and recovery sheaves support structure, the set abandonment and recovery cable sheaves guiding said abandonment and recovery cable from the abandonment and recovery winch into the firing line along said pipeline launch tower, and wherein the end fitting handling crane is adapted to transfer the end fitting over the pipeline guide into the firing line, below the set of two or more abandonment and recovery cable sheaves.

\* \* \* \* \*